(12) United States Patent
Angapova et al.

(10) Patent No.: US 11,051,141 B2
(45) Date of Patent: Jun. 29, 2021

(54) SELECTIVELY PROMPTING MATCHED INDIVIDUALS TO INITIATE AN IN-PERSON MEETING

(71) Applicant: AMI Holdings Limited, Hamilton (BM)

(72) Inventors: Natalia Angapova, London (GB); John Kneeland, London (GB); Claire Stott, London (GB)

(73) Assignee: AMI Holdings Limited, Hamilton (BM)

( * ) Notice: Subject to any disclaimer, the term of this patent is extended or adjusted under 35 U.S.C. 154(b) by 0 days.

(21) Appl. No.: 16/742,427

(22) Filed: Jan. 14, 2020

(65) Prior Publication Data

US 2020/0228941 A1    Jul. 16, 2020

Related U.S. Application Data

(60) Provisional application No. 62/792,606, filed on Jan. 15, 2019.

(51) Int. Cl.
*H04W 4/21*    (2018.01)
*G06Q 10/10*    (2012.01)
(Continued)

(52) U.S. Cl.
CPC .......... *H04W 4/21* (2018.02); *G06Q 10/107* (2013.01); *G06Q 10/1095* (2013.01);
(Continued)

(58) Field of Classification Search
CPC .. G06Q 10/107; G06Q 10/1095; G06Q 50/01; H04L 51/32; H04L 67/306;
(Continued)

(56) References Cited

U.S. PATENT DOCUMENTS

| 8,566,327 B2 | 10/2013 | Carrico et al. |
| D755,814 S | 5/2016 | Rad et al. |

(Continued)

OTHER PUBLICATIONS

International Search Report and Written Opinion in International Appln. No. PCT/US2020/13435, dated Mar. 25, 2020, 10 pages.

*Primary Examiner* — Frantz B Jean
(74) *Attorney, Agent, or Firm* — Fish & Richardson P.C.

(57) ABSTRACT

A computer implemented method includes monitoring at a server electronic communications over a network between a first matched individual at a first client device and a second matched individual at a second client device. The monitoring includes observing initiator electronic communication contributions originating at the first client device and recipient electronic communication contributions originating at the second client device, maintaining a total electronic communications count between the first client device and the second client device, and measuring an electronic communications duration period from an initial initiator electronic communication and a last electronic communication. Based on the monitored electronic communications, it is determined that one or both of the first matched individual and the second matched individual are ready for an in-person meeting. A prompt is supplied to the first client device to initiate the in-person meeting.

33 Claims, 5 Drawing Sheets

(51) Int. Cl.
*H04L 29/08* (2006.01)
*G06Q 50/00* (2012.01)
*H04W 4/02* (2018.01)
*H04L 12/58* (2006.01)

(52) U.S. Cl.
CPC ............. *G06Q 50/01* (2013.01); *H04L 51/32* (2013.01); *H04L 67/18* (2013.01); *H04L 67/306* (2013.01); *H04W 4/023* (2013.01)

(58) Field of Classification Search
CPC ........ H04L 67/18; H04W 4/21; H04W 4/023; H04N 21/44226
USPC ........................................................ 709/204
See application file for complete search history.

(56) References Cited

U.S. PATENT DOCUMENTS

| | | |
|---|---|---|
| D776,540 S | 2/2017 | Rad et al. |
| D781,311 S | 3/2017 | Rad et al. |
| D781,334 S | 3/2017 | Rad et al. |
| D791,809 S | 7/2017 | Rad et al. |
| 9,733,811 B2 | 8/2017 | Rad et al. |
| D798,314 S | 9/2017 | Rad et al. |
| 9,959,023 B2 | 5/2018 | Rad et al. |
| 10,530,923 B1* | 1/2020 | Leeds ............... H04M 3/42348 |
| 2010/0077032 A1* | 3/2010 | Drennan ................ G06Q 30/02 709/206 |
| 2011/0138305 A1* | 6/2011 | Akai ...................... G06Q 30/08 715/753 |
| 2011/0219310 A1* | 9/2011 | Robson ................. G06Q 30/02 715/733 |
| 2012/0036181 A1 | 2/2012 | Isidore |
| 2018/0150205 A1 | 5/2018 | Rad et al. |
| 2018/0292981 A1 | 10/2018 | Rad et al. |

* cited by examiner

SELECTIVELY PROMPTING MATCHED INDIVIDUALS TO INITIATE AN IN-PERSON MEETING

PRIORITY

This application claims priority to and the benefit of U.S. Application Ser. No. 62/792,606, filed on Jan. 15, 2019, the contents of which is incorporated here by reference in its entirety.

TECHNICAL FIELD

This disclosure relates generally to social media dating applications deployed in computer networks.

BACKGROUND

Social media dating applications propose matches between individuals. Once a proposed match is accepted, matched individuals may communicate with one another electronically using the dating application.

SUMMARY

In general, in an aspect, a computer implemented method includes monitoring at a server electronic communications over a network between a first matched individual at a first client device and a second matched individual at a second client device. The monitoring includes observing initiator electronic communication contributions originating at the first client device and recipient electronic communication contributions originating at the second client device, maintaining a total electronic communications count between the first client device and the second client device, and measuring an electronic communications duration period from an initial initiator electronic communication and a last electronic communication. Based on the monitored electronic communications, it is determined that one or both of the first matched individual and the second matched individual are ready for an in-person meeting. A first prompt is supplied to the first client device to initiate the in-person meeting.

In general, in an aspect, a system includes one or more processors coupled to a memory, the one or more processors configured to monitor electronic communications over a network between a first matched individual at a first client device and a second matched individual at a second client device. The monitoring includes observing initiator electronic communication contributions originating at the first client device and recipient electronic communication contributions originating at the second client device, maintaining a total electronic communications count between the first client device and the second client device, and measuring an electronic communications duration period from an initial initiator electronic communication and a last electronic communication. Based on the monitored electronic communications, it is determined that one or both of the first matched individual and the second matched individual are ready for an in-person meeting. A first prompt is supplied to the first client device to initiate the in-person meeting.

In general, in an aspect, a non-transitory computer readable medium stores instructions for causing a computing system to monitor electronic communications over a network between a first matched individual at a first client device and a second matched individual at a second client device. The monitoring includes observing initiator electronic communication contributions originating at the first client device and recipient electronic communication contributions originating at the second client device, maintaining a total electronic communications count between the first client device and the second client device, and measuring an electronic communications duration period from an initial initiator electronic communication and a last electronic communication. Based on the monitored electronic communications, it is determined that one or both of the first matched individual and the second matched individual are ready for an in-person meeting. A first prompt is supplied to the first client device to initiate the in-person meeting.

Implementations of any of the previously listed aspects may include one or a combination of two or more of the following features. A second prompt may be supplied to the second client device to initiate the in-person meeting. The second prompt may be supplied to the second client device in response to the first client device accepting the first prompt to initiate the in-person meeting. An in-person meeting scheduling prompt may be supplied to each of the first client device and the second client device scheduling prompt in response to the first client device accepting the first prompt to initiate the in-person meeting and the second client device accepting the second prompt to initiate the in-person meeting. Determining that one or both of the first matched individual and the second matched individual are ready for the in-person meeting may include determining that a communication ratio between the initiator electronic communication contributions and the recipient electronic communication contributions satisfies a measure. Determining that one or both of the first matched individual and the second matched individual are ready for the in-person meeting may include determining that the total electronic communications count exceeds a minimum electronic communications count. Determining that one or both of the first matched individual and the second matched individual are ready for the in-person meeting may include determining that the electronic communications duration period exceeds a minimum electronic communications duration period. Monitoring may include observing content in the electronic communications between the first matched individual and the second matched individual, and determining that one or both of the first matched individual and the second matched individual are ready for the in-person meeting may include determining that the content includes one or more keywords. The one or more keywords may include a phone number or a social media profile of the first or second matched individuals. A geographical location for each of the first matched individual at the first client device and the second matched individual at the second client device may be obtained, and determining that one or both of the first matched individual and the second matched individual are ready for the in-person meeting may include determining that the geographical location of the first matched individual was within a predefined distance of the geographical location of the second matched individual during a particular time interval. Monitoring of the electronic communications may stop automatically in response to supplying the first prompt to the first client device.

The approaches described here can have one or more of the following advantages. In some implementations, the techniques described here may determine whether matched individuals are ready for an in-person meeting based on, for example, information gleaned from monitoring electronic communications between the individuals. In this manner, an informed decision about the potential interest in an in-person meeting can be made for one or both of the matched individuals, which may enhance the individual's experience with the dating application and improve the dating application itself. In some implementations, adaptive monitoring techniques may be employed which may reduce the computing, network, and storage resources consumed by the monitoring operations while maintaining the ability to accurately identify whether the matched individuals are ready for an in-person meeting. If it is determined that the matched individuals are ready for an in-person meeting, the techniques described here can supply prompts to the individuals to initiate and schedule an in-person meeting. This allows matched individuals to make a decision to meet more confidently, thereby improving their experience with the dating application. Further, by selectively encouraging in-person meetings under appropriate circumstances, the dating application can bring individuals together in person which may reduce the volume of electronic communications between the matched individuals. These and other aspects of the technology may reduce the processor cycles, memory usage, and power consumption at both the server and client devices executing the dating application, and may reduce the amount of data transmitted over a network connecting the server and the client devices.

These and other aspects, features, and implementations can be expressed as methods, apparatus, systems, components, program products, methods of doing business, means or steps for performing a function, and in other ways, and will become apparent from the following descriptions, including the claims.

DETAILED DESCRIPTION

Figure 1:
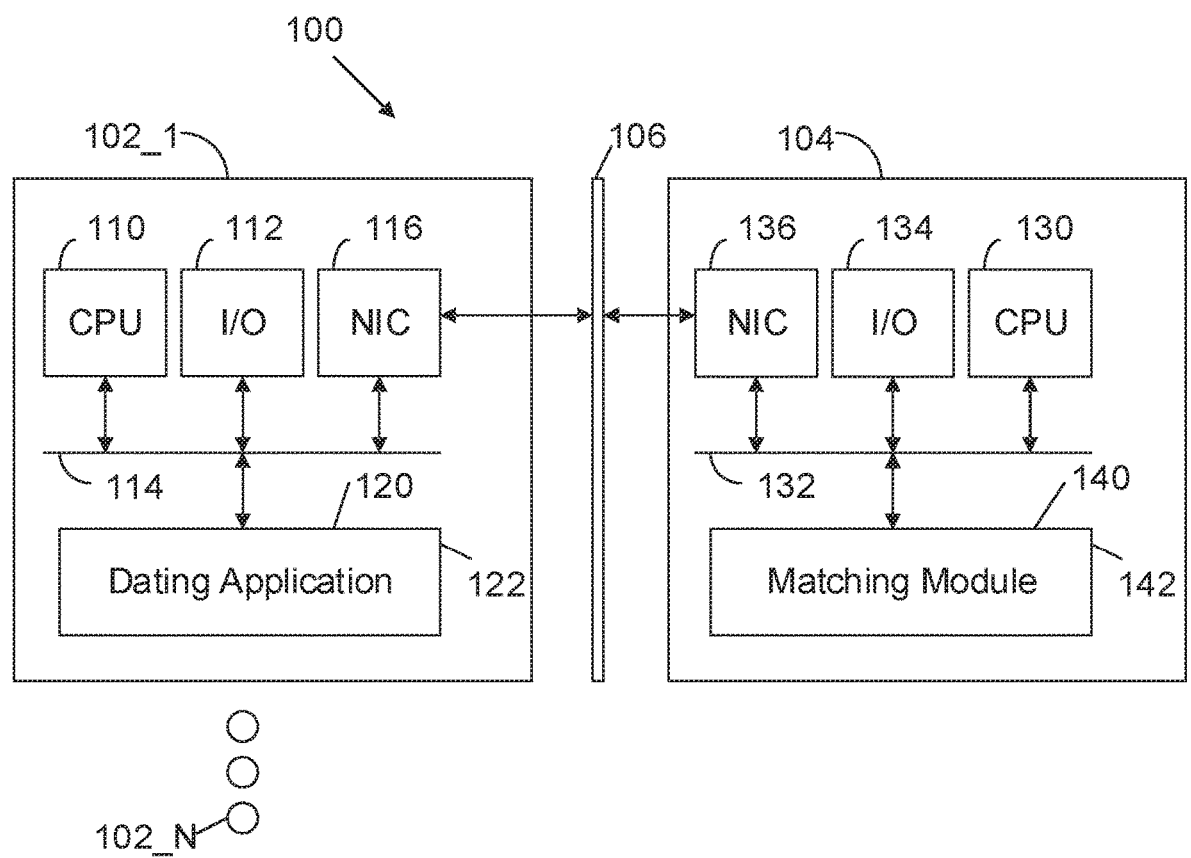
FIG. 1 illustrates a system.

The technology described here relates to selectively prompting matched individuals in a dating application to initiate an in-person meeting. In some implementations, the techniques described here can determine when one or both of the matched individuals are ready for an in-person meeting based on information gleaned from electronic communications between the individuals, among other information. If it is determined that the matched individuals are ready for an in-person meeting, the techniques described here can supply prompts to the individuals to initiate and schedule an in-person meeting. These and other aspects of the technology may improve the individual's experience with the dating application and reduce the volume of electronic communications between the matched individuals, which may reduce the processor cycles, memory usage, and power consumption at both the server and client devices executing the dating application, and may reduce the amount of data transmitted over a network connecting the server and the client devices.

In general, a user of a client device may create a personal profile to participate in a dating application, social network, etc. A user's personal profile may include a name, age, city, photographs, biographical text, links to social media profiles on other networks, and a range of other fields that allow the user to characterize himself or herself. Once a profile is complete, a user can begin to view the profiles of other users, while the user's own profile is circulated among the user base.

A user may receive profiles of other users who have met predefined criteria, which may have been supplied by the user. The user is able to explore the personal information that has been added to a profile. Profiles may be served to the user one-by-one, with the option to look through multiple pictures per profile, expand text, and click through to external information and profiles on other social networks. To ascertain the mutual agreement to connect two users together, every profile viewed may be 'selected.' For example, having viewed the personal profile of another user, the viewing user may select 'yes' by, for example, interacting with a first user interface button (e.g., a heart-shaped button) or swiping (e.g., clicking and dragging the profile using their finger) the served profile off the screen in a certain direction (e.g., right) if they would like to connect with that specific user, or selecting 'no' by, for example, interacting with a second user interface button (e.g., a cross-shaped button) or swiping in another direction (e.g., left) if they are not interested in connecting.

In some embodiments, once a user has selected 'yes' on the profile of another user, a matching module may place the profile of the first user into the queue of profiles to be viewed by the second user. Through this mechanism the matching module is able to accelerate the pace with which two users may view each other's profiles than would happen in a purely organic system of profile selection.

In some embodiments, when one user selects 'yes' but the other user selects 'no', no further connection is established between the two users, and their profiles may not be shown to each other again (or they may be shown again depending on changes within their profile, location, search parameters, or because of time elapsed). When two users both mutually select 'yes' upon the other user's profile, a connection (sometimes referred to as a "match") is established between the two accounts. In this way, the operation of the matching module can enable the intention of each user to be communicated to one or more other users within the social network.

Once a match is established, the matching module may supply a notification of the match to either of both of the matched individuals with a prompt to contact the other matched individual. In some embodiments, matched users are directed to a messaging system in the dating application supported by, for example, a server to contact the other matched individual. Once users are within the messaging system, they can send messages back and forth to one-another. In some embodiments, the messaging system can display elements of a user's profile in order to increase recognition of the other user (e.g., name, age, photograph, etc.).

The matching module may monitor messages between the matched users, such as by monitoring the initiator of the message, the recipient of the message, or the content of the message, among others. In some cases, the matching module may employ adaptive monitoring techniques to reduce the computing, network, and storage resources consumed by the monitoring operations. Based in part on information from the monitored messages, the matching module may determine that one or both of the matched users are ready for an in-person meeting. In response, the matching module may supply prompts to the matched users to initiate and schedule an in-person meeting.

FIG. 1 illustrates a system 100 for selectively prompting matched individuals to initiate an in-person meeting. The system 100 includes a set of client devices 102_1 through 102_N in communication with a server 104 via a network 106, which may be any combination of wired and wireless networks. Each client device 102 includes a processor (e.g., central processing unit) 110 in communication with input/output devices 112 via a bus 114. The input/output devices 112 may include a keyboard, mouse, touch display and the like. A network interface circuit 116 is also connected to the bus 114 to provide connectivity to the network 106. A memory 120 is also connected to the bus 114. The memory 120 stores instructions executed by the processor 110. In particular, the memory 120 stores a dating application 122, which communicates with server 104 to coordinate introductions between individuals that have been identified as potential matches. Typically, each client device 102_1 through 102_N is a mobile device (e.g., smartphone, laptop, tablet, etc.) executing the dating application 122. Different client devices 102_1 through 102_N are operated by different individuals that subscribe to the same dating application 122.

The server 104 includes a processor 130, bus 132, input/output devices 134 and a network interface circuit 136 to provide connectivity to the network 106. A memory 140 is connected to the bus 132. The memory 140 stores a matching module 142 with instructions executed by the processor 130 to implement operations disclosed in connection with FIGS. 2 and 3.

Figure 2:
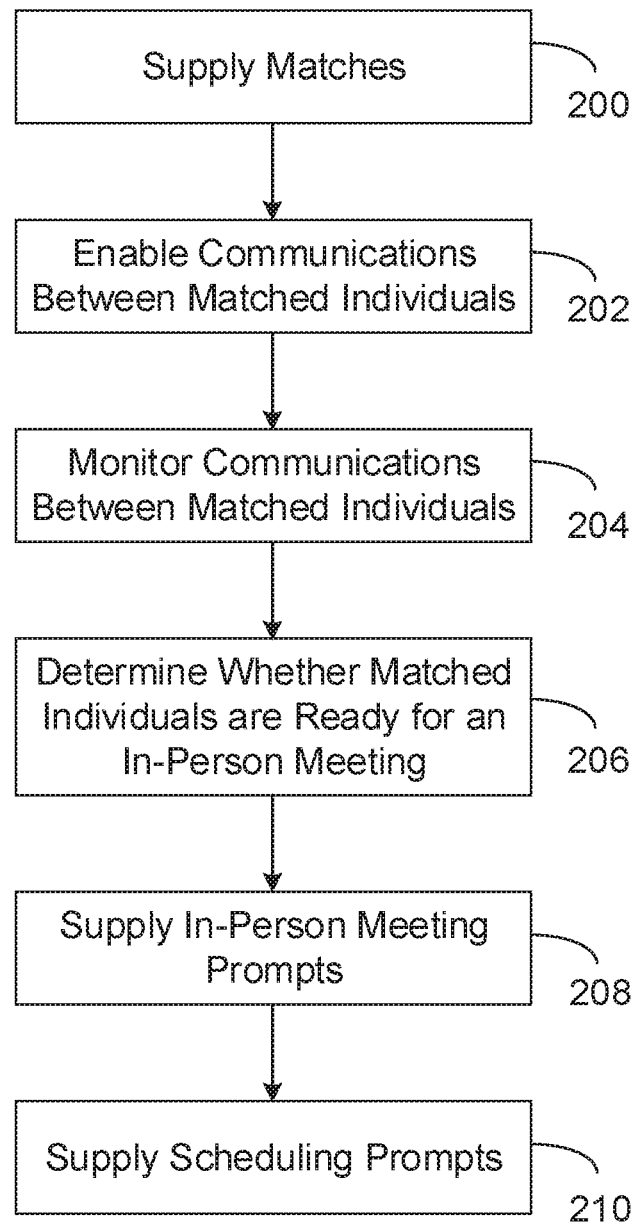
FIGS. 2 and 3 illustrate processing operations.

Turning to FIG. 2, a flow chart is presented that illustrates operations of the matching module 142. In some implementations, the matching module 142 may supply matches to users of the dating application 122 (200). More particularly, the matching module 142 may send a notification of a match to a first matched individual operating a first client device (e.g., client device 102_1) with a prompt to contact a second matched individual operating a second client device (e.g., client device 102_2). The matching module 142 may use any number of criteria, such as age, gender, geographical area, height, weight, or appearance, among others, to determine that the first matched individual is, for example, an appropriate potential partner or friend for the second matched individual. The matching module 142 may use any number of techniques including applied rules, collaborative filtering, machine learning, or combinations of them, among others, to generate matches based on the criteria.

In some implementations, matches may be predicated on acceptance by one or both of the individuals. For example, the matching module 142 may send a notification of a potential match to the client devices 102 operated by one or both of the individuals with a prompt for the individual to accept or decline the match. The individual may then accept the match through a first gesture (e.g., selection of a first user interface button or a swipe to the left on the screen, among others) or decline the match through a second gesture (e.g., selection of a second user interface button or a swipe to the right on the screen, among others).

After matches are supplied, network communication between matched individuals may be enabled (202). For example, the dating application 122 may provide a messaging system supported by the server 104 that enables network communication in the form of a text or multimedia message between the first matched individual and the second matched individual.

Next, communications between matched individuals are monitored (204). For example, the matching module 142 of the server 104 may monitor communications over the network 106 between the first matched individual operating the first client device (e.g., client device 102_1) and the second matched individual operating the second client device (e.g., client device 102_2). Monitoring may broadly include observing any aspect, characteristic, or feature of the communication or its participants, or both. For example, monitoring may include one or a combination of two or more of the following: observing initiator electronic communication contributions originating at the first client device 102_1 and recipient electronic communications contributions originating at the second client device 102_2, maintaining a total electronic communications count between the first client device 102_1 and the second client device 102_2, measuring an electronic communications duration period from an initial initiator electronic communication and a last electronic communication, and observing the content of an electronic communication, such as whether the communication includes one or more keywords or phrases.

Because monitoring the communications between matched individuals may consume significant resources at the server 104, over the network 106, and at other components in the system 100, the matching module 142 may employ adaptive monitoring techniques in some implementations. For example, the matching module 142 may employ limited monitoring operations, such as by not monitoring the content of the electronic communications, until the occurrence of a triggering event, such as each of matched individuals having initiated an electronic communication. Once the triggering event occurs, the matching module 142 may automatically commence full monitoring operations to collect data for use in determining whether the matched individuals are ready for an in-person meeting. In some cases, the matching module 142 may stop monitoring the communications between the matched individuals once it is determined that the matched individuals are ready for an in-person meeting and in-person meeting prompts are supplied. In some cases, such as when the matched individuals accept or schedule the in-person meeting, the matching module 142 may automatically cease monitoring communications between the matched individuals even if the individuals continue conversation in the dating application 122. In some cases, the matching module 142 may automatically reinitiate full or limited monitoring if one or both of the matched individuals do not accept the in-person meeting prompt or fail to schedule the in-person meeting. By adaptively monitoring the electronic communications between matched individuals, the matching module may reduce the processor cycles, memory and storage space, and power consumed by the monitoring operations at the server 104, and may reduce the amount of data transmitted over the network 106, among other advantages.

Based on the monitored communications, it is determined whether the matched individuals are ready for an in-person meeting (206). For example, the matching module 142 may process data obtained from monitoring the communications between the matched individuals, among other data, to produce one or more criteria for determining whether the matched individuals are potentially interested in an in-person meeting. By detecting whether the matched individuals are ready for an in-person meeting, the matching module 142 can facilitate the in-person meeting which may improve the user's experience with the dating application 122 and may reduce the volume of electronic communications between matched individuals.

Figure 3:
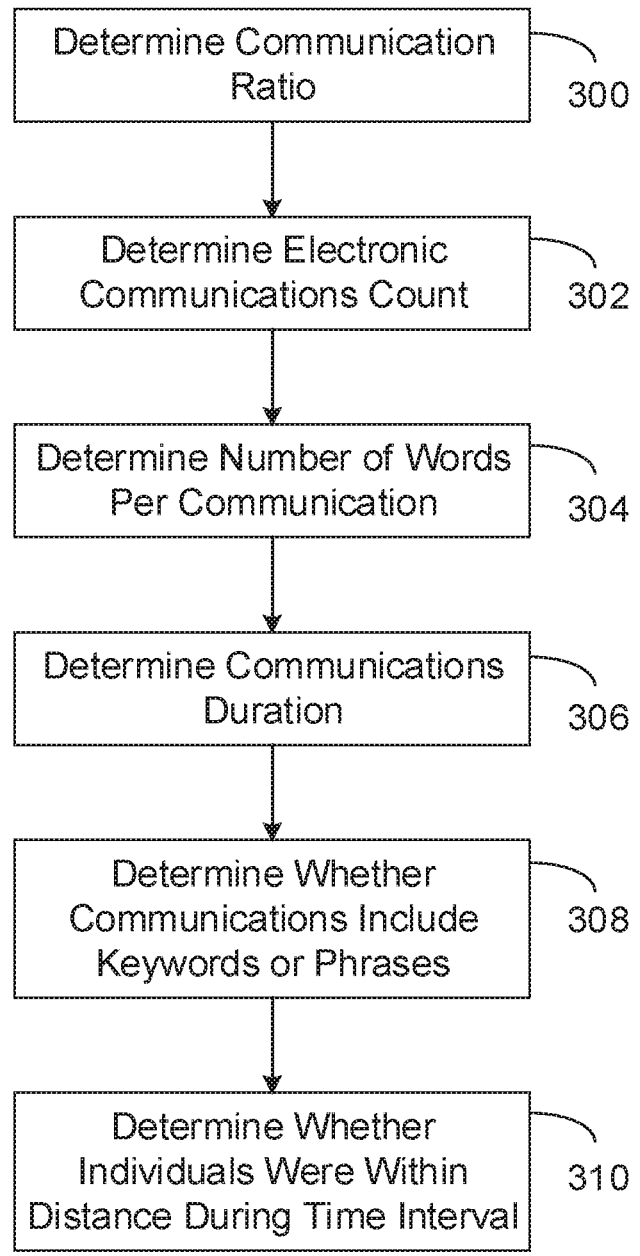

Turning to FIG. 3, a flow chart is presented that illustrates operations for producing criteria that can be used to determine whether matched individuals are ready for an in-person meeting. Although FIG. 3 illustrates a series of operations for producing a specific set of criteria, some implementations may include fewer or additional operations producing fewer or additional criteria.

In some implementations, the matching module 142 may determine a communication ratio for the conversation between the matched individuals (300). The communication ratio may be determined by dividing the number of communications originating from (or received by) a matched individual by the total communications count between the matched individuals. In this manner, the matching module 142 can determine whether both matched individuals are contributing to the conversation, which, if so, may suggest that the conversation is meaningful and that both matched individuals are potentially interested in an in-person meeting.

In some implementations, the matching module 142 may determine an electronic communications count for the conversation between the matched individuals (302). The electronic communications count may represent the total number of electronic communications transmitted between the matched individuals. In this manner, the matching module 142 may use the quantity of electronic communications as a measure of the potential interest of the matched individuals for an in-person meeting.

In some implementations, the matching module 142 may determine a number of words per communication for the conversation between the matched individuals (304). For example, the matching module 142 may calculate an average word count for some or all of the communications in the conversation. In some cases, the matching module 142 may calculate one or more other word count metrics, such as a minimum or maximum word count for the conversation. In some cases, the matching module 142 may break down some or all of the word count metrics into, for example, word count by matched individual or word count by time-period, among others. Because longer communications may be indicative of a more meaningful conversation, the matching module 142 can use word count as a measure of interest by the matched individuals for an in-person meeting.

In some implementations, the matching module 142 may determine an electronic communications duration for the conversation between the matched individuals (306). For example, the matching module 142 may calculate a duration between a first electronic communication timestamp and a most recent electronic communication timestamp. In this manner, the matching module 142 can determine whether the matched individuals have shown a sustained interest through their conversation, which may indicate whether the matched individuals are ready for an in-person meeting.

In some implementations, the matching module 142 may determine whether one or more keywords or phrases are present in the electronic communications count between the matched individuals (308). The matching module 142 may use any number of techniques including keyword searches and natural language processing, among others, to detect the keywords or phrases. For example, the matching module 142 may determine whether the communications include one or more keywords indicative of an expressed interest in the conversation, such as "It's so nice talking to you" or "We have so much in common." Similarly, in some cases, the matching module 142 may determine whether the communications include one or more keywords indicative of an expressed interest in an in-person meeting, such as "We should go out some time," "Do you want to meet for coffee?," or simply "go out" or "coffee?" In this manner, the matching module 142 can facilitate an in-person meeting between matched individuals when one or both of the individuals express an interest during conversation.

In some cases, the matching module 142 may determine whether the communications include keywords or phrases indicative of one or both of the matched individuals having shared their phone number, social media profile, or another alternative form of communication. By doing so, the matching module 142 can determine whether the matched individuals have taken their conversation beyond the dating application 122 and therefore may be interested in an in-person meeting.

In some implementations, the matching module 142 may use machine learning techniques to identify other keywords or phrases indicative of readiness for an in-person meeting. The machine learning techniques may be trained, for example, using conversations of other matched individuals that successfully scheduled an in-person meeting, among other data. In this manner, the matching module 142 can identify matched individuals that are ready for an in-person meeting earlier in the conversation and with improved accuracy, which may enable the matching module 122 to facilitate earlier in-person meetings between matched individuals, thereby reducing the volume of electronic communications and improving the individual's experience with the dating application 122 and the dating application itself.

In some implementations, the matching module 142 may determine whether the matched individuals were within a predefined geographic distance of one another within a particular time interval (310). For example, the matching module 142 may periodically obtain the geographic location of the first matched individual operating the first client device 102_1 and the geographic location of the second matched individual operating the second client device 102_2. The geographic location of each individual may be obtained from a location sensor included in each of the client devices 102_1, 102_2 or from other techniques known in the art. Based on the geographic locations of each individual, the matching module 142 may determine if the individuals were within a predefined geographic distance, such as 50 meters, within a particular time interval, such as a 30 minute interval. Because it may be particularly easy for individuals who travel to similar locations during similar time periods to meet in-person, the matching module 142 can infer that matched individuals who meet this criteria are ready for an in-person meeting.

The matching module 142 may determine whether the matched individuals are ready for an in-person meeting based on some or all of the operations and criteria described with reference to blocks 300 through 310. To do so, the matching module 142 may apply rules, dynamic thresholds, weighting algorithms, or combinations of them, among other techniques, to the criteria. For instance, in some cases, the matching module 142 may determine whether the conversation between the matched individuals satisfies a minimum communication ratio (e.g., at least 30% of electronic communications, indicating that each matched individual has initiated at least 30% of the electronic communications and has been a recipient of no more than 70% of the electronic communications). In some cases, the matching module 142 may determine whether the conversation satisfies a minimum electronic communications count, such as seven communications. In some cases, the matching module 142 may determine whether the average number of words per electronic communication satisfies a threshold value, such as ten words per communication. In some cases, the matching module 142 may determine whether the duration of the conversation satisfies a minimum communication duration threshold, such as eight hours. In some cases, the matching module 142 may flag the existence (or absence) of criteria, including whether the individuals were within a similar place during a similar time (310) or shared certain keywords or phrases during their electronic communications (308), such as a phone number or a social media profile.

In some implementations, the matching module 142 may determine that the matched individuals are ready for an in-person meeting based on a determination that each criteria described with reference to blocks 300 through 310 is satisfied. In some cases, the matching module 142 may determine that the matched individuals are ready for an in-person meeting based on a subset of the criteria being satisfied. For example, the matching module 142 may determine that the matched individuals are ready for an in-person meeting if their conversation satisfies the communication ratio, the minimum electronic communication count, the minimum word words per communication, and the minimum electronic communication duration. In some cases, the matching module 142 may treat satisfaction of one or more criteria as dispositive of readiness for an in-person meeting. For example, if the matched individuals were in a similar place during a similar time or shared certain keywords or phrases during their electronic communications, such as a phone number or a social media profile, the matching module 142 may determine that the matched individuals are ready for an in-person meeting.

In some implementations, the matching module 142 may use various techniques, including machine learning techniques trained, for example, on conversations of other matched individuals that have successfully scheduled an in-person meeting, among other data, to identify which criteria are most strongly correlated with readiness for an in-person meeting. In this manner, the matching module 142 can prioritize the criteria which can enable the matching module to selectively execute operations to produce some or all of the criteria. For example, the matching module 142 may execute operations in a priority order to produce high-priority criteria first, and may then process the high-priority criteria to determine whether the matched individuals are ready for an in-person meeting. In this manner, the matching module 142 may reduce the number of operations that are executed and the amount of criteria that are produced and processed to determine whether the matched individuals are ready for an in-person meeting, which may reduce consumption of computational resources at, for example, the server 104.

Figure 4:
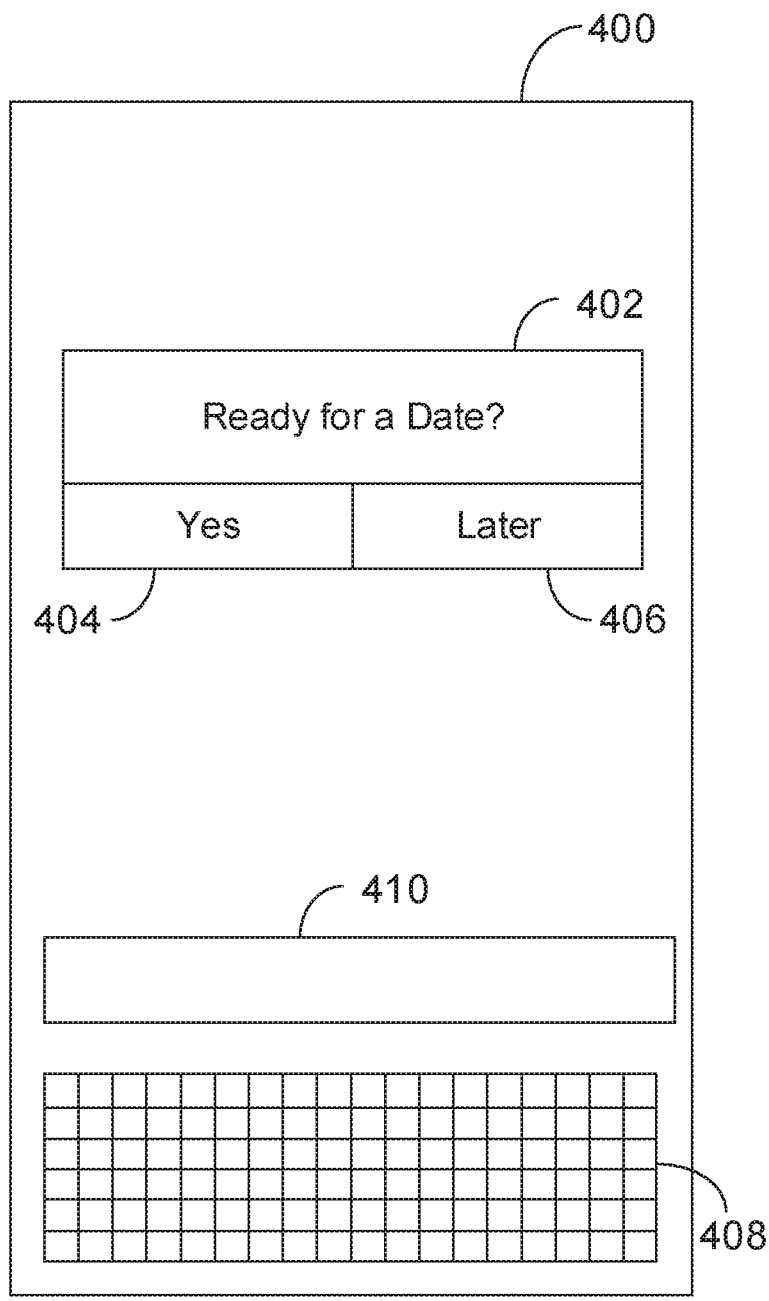
FIGS. 4 and 5 illustrate user interfaces.
Like reference symbols in the various drawings indicate like elements.

Returning to FIG. 2, if it is determined that the matched individuals are ready for an in-person meeting, in-person meeting prompts are supplied (208). More particularly, the matching module 142 may supply a notification to one or both of the matched individual operating the client devices 102_1, 102_2 with a prompt for the individual to indicate whether an in-person meeting is of interest at this point in time. For example, FIG. 4 illustrates a mobile device interface 400 with a prompt 402 to an individual to indicate whether he or she is "Ready for a Date?" (e.g., an in-person meeting). In response, the individual may select a "Yes" prompt response 404 to accept the in-person meeting or a "Later" prompt response 406 to decline the meeting at this time. The interface 400 may also include a keyboard 408. Input to the keyboard 408 results in text being displayed in a text box 410. By selectively prompting matched individuals for an in-person meeting, the matching module 142 can bring together matched individuals deemed to be ready while avoiding potential rejection or other negative experiences by individuals who are not ready, which may improve the user's experience with the dating application 122 and may reduce the volume of electronic communications between matched individuals In some implementations, the matching module 142 may supply in-person meeting prompts to both of the matched individuals concurrently. Alternatively, in some implementations, the matching module 142 may supply an in-person meeting prompt to one of the matched individuals, and then may determine whether to supply an in-person meeting prompt to the other of the matched individuals based on the response received to the first in-person meeting prompt. The matching module 142 may determine which of the matched individuals should receive the first in-person meeting prompt based on any number of factors, including gender, the initiator or recipient of the first electronic communication between the matched individuals, the initiator or recipient of the majority of electronic communications between the matched individuals, among others. In some cases, the matching module 142 may store data regarding previous successfully scheduled in-person meetings between other matched individuals, and may use machine learning or other techniques to determine which individual should receive the first in-person meeting prompt based on a machine learning analysis of the stored data. By making an informed decision regarding which of the matched individuals should receive the first in-person meeting prompt, the matching module 142 can increase the likelihood that matched individuals will agree to an in-person meeting which may improve the user's experience with the dating application 122 and may reduce the volume of electronic communications between matched individuals.

Returning to FIG. 2, if one or both of the matched individuals select the "Later" input 406, control returns to block 204 of FIG. 2. In some implementations, the matching module 142 may supply a notification to one or both of the matched individuals indicating that the individuals are not ready for an in-person meeting and encouraging the individuals to continue conversation in the dating application 122.

Figure 5:
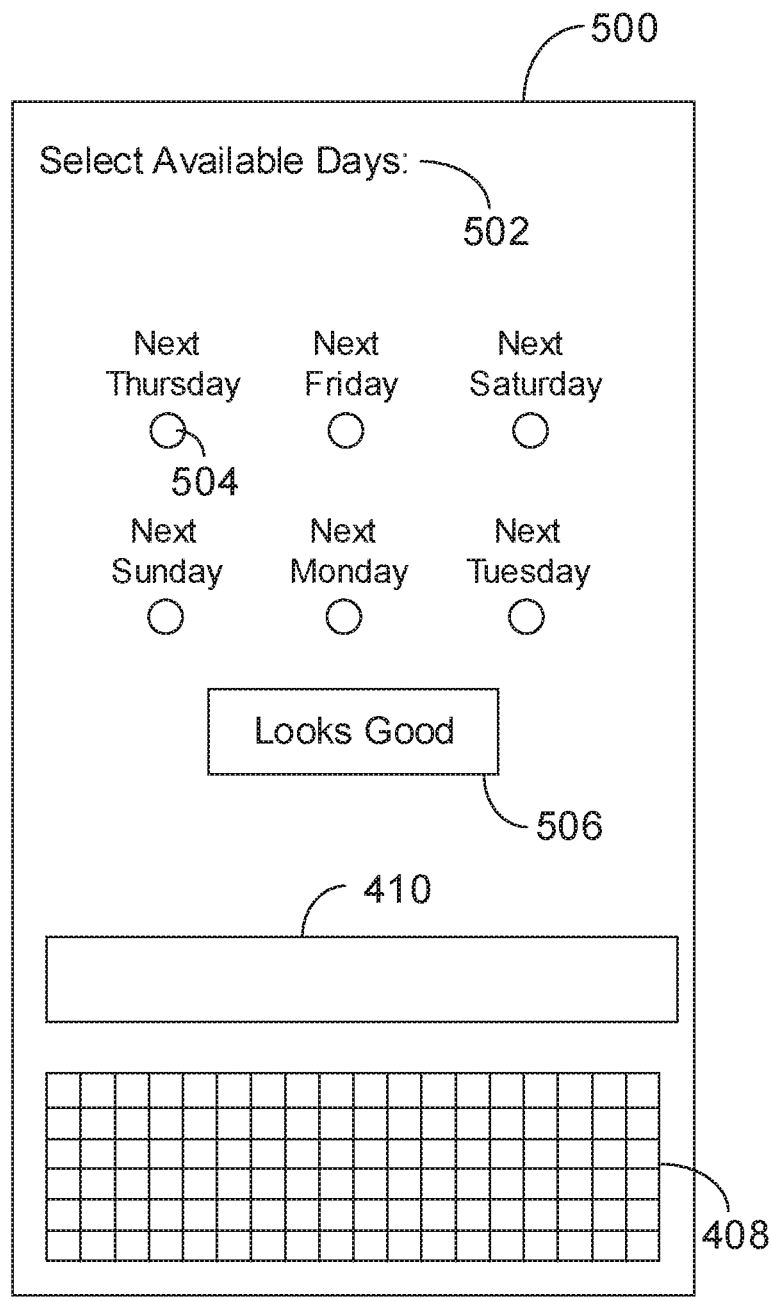

On the other hand, if both of the matched individuals indicate that they are interested in an in person meeting (e.g., by selecting the "Yes" prompt 404), scheduling prompts are supplied (210). More particularly, the matching module 142 may supply a notification to each of the matched individuals operating the client devices 102_1, 102_2 with a prompt for the individual to indicate his or her availability for an in-person meeting. For example, FIG. 5 illustrates a mobile device interface 500 with a prompt 502 for an individual to select one or more days that the individual may be available. Each day has an associated radio button 504, which may be selected. In some implementations, the individual may be prompted to select a minimum number of days (e.g., two days) that he or she is available. Once the individual has indicated their availability, the individual can select a "Looks Good" button 506 to submit the availability to the matching module 142. The matching module 142 may process the information received in response to the scheduling prompts to advise the matched individuals of dates that both are available. The matched individuals may then use the keyboard 408 to communicate plans to finalize a time and meeting place. In some cases, the matching module 142 may provide suggestions for the in-person meeting, such as a suggested time or place for the meeting.

In some implementations, if each of the matched individuals accept the in-person meeting prompt or schedule the in-person meeting (e.g., by both being available during one or more days), the matching module 142 may automatically cease monitoring the electronic communications between the matched individuals even if the individuals continue conversation in the dating application 122. In this manner, the matching module 142 may reduce the computing and network resources consumed by the monitoring operations.

If the matching module 142 determines that there are no days when both of the matched individuals are available, control returns to block 210 of FIG. 2. The matching module 142 may then supply additional scheduling prompts with new days for the in-person meeting either immediately or after a timeout period (e.g., one day). In some implementations, the matching module 142 may provide a notification to the individuals that they are ready for an in-person meeting with a prompt for the individuals to use the dating application 122 to find a day when they are both available. In some implementations, the matching module 142 may continue or reinitiate monitoring of the electronic communications between the matched individuals if the matching module determines that there are no days when both of the individuals are available, or that the individuals otherwise failed to schedule an in-person meeting.

The disclosed techniques identify matched individuals that are likely to be ready for an in-person meeting. This allows matched individuals to make a decision to meet more confidently, thereby improving social media dating application experiences.

The matching module 142 operates to selectively encourage in-person meetings under appropriate circumstances. As a result, the volume of electronic communications between matched individuals may be reduced. This results in reduced processor cycles and memory usage at both the server 104 and client devices 102, and reduced data transmission over the network 106. The client devices 102 also achieve the important technical benefit of reduced battery use.

The approaches described here can be implemented at least in part using a computer storage product with a computer readable storage medium having computer code thereon for performing various computer-implemented operations. The media and computer code may be those specially designed and constructed for the purposes of the approaches described here, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, the approaches described here may be implemented using JAVA®, C++, or other object-oriented programming language and development tools. In some examples, the approaches described here may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the approaches described here. Thus, the foregoing descriptions of specific embodiments are presented for purposes of illustration and description. They are not intended to be exhaustive or to limit the invention to the precise forms disclosed; obviously, many modifications and variations are possible in view of the above teachings. The embodiments were chosen and described in order to best explain the principles of the approaches described here and its practical applications, they thereby enable others skilled in the art to best utilize the approaches described here and various embodiments with various modifications as are suited to the particular use contemplated. Other implementations not specifically described here are also within the scope of the following claims.

What is claimed is:

1. A computer implemented method comprising:
monitoring at a server electronic communications over a network between a first matched individual at a first client device and a second matched individual at a second client device, wherein monitoring includes
observing initiator electronic communication contributions originating at the first client device and recipient electronic communication contributions originating at the second client device,
maintaining a total electronic communications count between the first client device and the second client device, and
measuring an electronic communications duration period from an initial initiator electronic communication and a last electronic communication;
determining, based on the monitored electronic communications, that one or both of the first matched individual and the second matched individual are ready for an in-person meeting; and
supplying to the first client device a first prompt to initiate the in-person meeting.

2. The computer implemented method of claim 1 further comprising supplying to the second client device a second prompt in response to the first client device accepting the first prompt to initiate the in-person meeting.

3. The computer implemented method of claim 2 further comprising supplying to each of the first client device and the second client device a respective in-person meeting scheduling prompt in response to the first client device accepting the first prompt to initiate the in-person meeting and the second client device accepting the second prompt to initiate the in-person meeting.

4. The computer implemented method of claim 1 wherein determining that one or both of the first matched individual and the second matched individual are ready for the in-person meeting comprises determining that a communication ratio between the initiator electronic communication contributions and the recipient electronic communication contributions satisfies a measure.

5. The computer implemented method of claim 1 wherein determining that one or both of the first matched individual and the second matched individual are ready for the in-person meeting comprises determining that the total electronic communications count exceeds a minimum electronic communications count.

6. The computer implemented method of claim 1 wherein determining that one or both of the first matched individual and the second matched individual are ready for the in-person meeting comprises determining that the electronic communications duration period exceeds a minimum electronic communications duration period.

7. The computer implemented method of claim 1 wherein monitoring includes observing content in the electronic communications between the first matched individual and the second matched individual, and wherein determining that one or both of the first matched individual and the second matched individual are ready for the in-person meeting comprises determining that the content includes one or more keywords.

8. The computer implemented method of claim 7 wherein the one or more keywords include a phone number or a social media profile of the first or second matched individuals.

9. The computer implemented method of claim 1 further comprising obtaining a geographical location for each of the first matched individual at the first client device and the second matched individual at the second client device, wherein determining that one or both of the first matched individual and the second matched individual are ready for the in-person meeting comprises determining that the geographical location of the first matched individual was within a predefined distance of the geographical location of the second matched individual during a particular time interval.

10. The computer implemented method of claim 1 further comprising automatically stopping the monitoring of the electronic communications in response to supplying the first prompt to the first client device.

11. A system comprising:
one or more processors coupled to a memory, the one or more processors configured to:
monitor electronic communications over a network between a first matched individual at a first client device and a second matched individual at a second client device, wherein monitoring includes:
observing initiator electronic communication contributions originating at the first client device and recipient electronic communication contributions originating at the second client device,
maintaining a total electronic communications count between the first client device and the second client device, and
measuring an electronic communications duration period from an initial initiator electronic communication and a last electronic communication;
determine, based on the monitored electronic communications, that one or both of the first matched individual and the second matched individual are ready for an in-person meeting; and
supply to the first client device a first prompt to initiate the in-person meeting.

12. The system of claim 11 wherein the one or more processors are configured to supply to the second client device a second prompt in response to the first client device accepting the first prompt to initiate the in-person meeting.

13. The system of claim 12 wherein the one or more processors are configured to supply to each of the first client device and the second client device a respective in-person meeting scheduling prompt in response to the first client device accepting the first prompt to initiate the in-person meeting and the second client device accepting the second prompt to initiate the in-person meeting.

14. The system of claim 11 wherein determining that one or both of the first matched individual and the second matched individual are ready for the in-person meeting comprises determining that a communication ratio between the initiator electronic communication contributions and the recipient electronic communication contributions satisfies a measure.

15. The system of claim 11 wherein determining that one or both of the first matched individual and the second matched individual are ready for the in-person meeting comprises determining that the total electronic communications count exceeds a minimum electronic communications count.

16. The system of claim 11 wherein determining that one or both of the first matched individual and the second matched individual are ready for the in-person meeting comprises determining that the electronic communications duration period exceeds a minimum electronic communications duration period.

17. The system of claim 11 wherein monitoring includes observing content in the electronic communications between the first matched individual and the second matched individual, and wherein determining that one or both of the first matched individual and the second matched individual are ready for the in-person meeting comprises determining that the content includes one or more keywords.

18. The system of claim 17 wherein the one or more keywords include a phone number or a social media profile of the first or second matched individuals.

19. The system of claim 11 wherein the one or more processors are configured to obtain a geographical location for each of the first matched individual at the first client device and the second matched individual at the second client device, wherein determining that one or both of the first matched individual and the second matched individual are ready for the in-person meeting comprises determining that the geographical location of the first matched individual was within a predefined distance of the geographical location of the second matched individual during a particular time interval.

20. The system of claim 11 wherein the one or more processors are configured to automatically stop the monitoring of the electronic communications in response to supplying the first prompt to the first client device.

21. A non-transitory computer readable medium storing instructions for causing a computing system to:
monitor electronic communications over a network between a first matched individual at a first client device and a second matched individual at a second client device, wherein monitoring includes:
observing initiator electronic communication contributions originating at the first client device and recipient electronic communication contributions originating at the second client device,
maintaining a total electronic communications count between the first client device and the second client device, and
measuring an electronic communications duration period from an initial initiator electronic communication and a last electronic communication;
determine, based on the monitored electronic communications, that one or both of the first matched individual and the second matched individual are ready for an in-person meeting; and
supply to the first client device a first prompt to initiate the in-person meeting.

22. The non-transitory computer readable medium of claim 21 storing instructions for causing the computer system to supply to the second client device a second prompt in response to the first client device accepting the first prompt to initiate the in-person meeting.

23. The non-transitory computer readable medium of claim 22 storing instructions for causing the computer system to supply to each of the first client device and the second client device a respective in-person meeting scheduling prompt in response to the first client device accepting the first prompt to initiate the in-person meeting and the second client device accepting the second prompt to initiate the in-person meeting.

24. The non-transitory computer readable medium of claim 21 wherein determining that one or both of the first matched individual and the second matched individual are ready for the in-person meeting comprises determining that a communication ratio between the initiator electronic communication contributions and the recipient electronic communication contributions satisfies a measure.

25. The non-transitory computer readable medium of claim 21 wherein determining that one or both of the first matched individual and the second matched individual are ready for the in-person meeting comprises determining that the total electronic communications count exceeds a minimum electronic communications count.

26. The non-transitory computer readable medium of claim 21 wherein determining that one or both of the first matched individual and the second matched individual are ready for the in-person meeting comprises determining that the electronic communications duration period exceeds a minimum electronic communications duration period.

27. The non-transitory computer readable medium of claim 21 wherein monitoring includes observing content in the electronic communications between the first matched individual and the second matched individual, and wherein determining that one or both of the first matched individual and the second matched individual are ready for the in-person meeting comprises determining that the content includes one or more keywords.

28. The non-transitory computer readable medium of claim 27 wherein the one or more keywords include a phone number or a social media profile of the first or second matched individuals.

29. The non-transitory computer readable medium of claim 21 storing instructions for causing the computer system to obtain a geographical location for each of the first matched individual at the first client device and the second matched individual at the second client device, wherein determining that one or both of the first matched individual and the second matched individual are ready for the in-person meeting comprises determining that the geographical location of the first matched individual was within a predefined distance of the geographical location of the second matched individual during a particular time interval.

30. The non-transitory computer readable medium of claim 21 storing instructions for causing the computer system to automatically stop the monitoring of the electronic communications in response to supplying the first prompt to the first client device.

31. The method of claim 1 wherein observing the initiator electronic communication contributions originating at the first client device and the recipient electronic communication contributions originating at the second client device comprises:
   maintaining a first count of the initiator electronic communication contributions and a second count of the recipient electronic communication contributions; and
   comparing the first count and the second count to determine a communication ratio between the initiator electronic communication contributions and the recipient electronic communication.

32. The system of claim 11 wherein observing the initiator electronic communication contributions originating at the first client device and the recipient electronic communication contributions originating at the second client device comprises:
   maintaining a first count of the initiator electronic communication contributions and a second count of the recipient electronic communication contributions; and
   comparing the first count and the second count to determine a communication ratio between the initiator electronic communication contributions and the recipient electronic communication contributions.

33. The non-transitory computer readable medium of claim 21 wherein observing the initiator electronic communication contributions originating at the first client device and the recipient electronic communication contributions originating at the second client device comprises:
   maintaining a first count of the initiator electronic communication contributions and a second count of the recipient electronic communication contributions; and
   comparing the first count and the second count to determine a communication ratio between the initiator electronic communication contributions and the recipient electronic communication contributions.

* * * * *